(12) United States Patent
Arbuckle et al.

(10) Patent No.: US 9,453,098 B2
(45) Date of Patent: *Sep. 27, 2016

(54) METHOD FOR PREPARING A SOL-GEL RESIN

(71) Applicant: Hexion Inc., Columbus, OH (US)

(72) Inventors: Stephen W. Arbuckle, Louisville, KY (US); Gabriele Badini, Iserlohn (DE); John Huggins, Leverkusen (DE); Sanjay Gangal, Louisville, KY (US)

(73) Assignee: HEXION INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,142

(22) Filed: Apr. 23, 2014

(65) Prior Publication Data

US 2014/0323681 A1    Oct. 30, 2014

Related U.S. Application Data

(63) Continuation-in-part of application No. 14/259,884, filed on Apr. 23, 2014.

(60) Provisional application No. 61/815,401, filed on Apr. 24, 2013.

(51) Int. Cl.
*C08G 8/24* (2006.01)
*C08G 8/22* (2006.01)
*C08L 61/12* (2006.01)

(52) U.S. Cl.
CPC . *C08G 8/22* (2013.01); *C08G 8/24* (2013.01); *C08L 61/12* (2013.01)

(58) Field of Classification Search
CPC ................................. C08G 8/22; C08G 8/24
USPC .................................................. 528/144, 155
See application file for complete search history.

(56) References Cited

U.S. PATENT DOCUMENTS

| | | |
|---|---|---|
| 3,422,068 A | 1/1969 | Kreibich et al. |
| 4,061,620 A | 12/1977 | Gillern |
| 4,370,424 A | 1/1983 | Baumann |
| 4,373,062 A | 2/1983 | Brown |
| 5,508,341 A | 4/1996 | Mayer et al. |
| 6,815,137 B2 | 11/2004 | Hoshi et al. |
| 2011/0303880 A1 | 12/2011 | Mulik et al. |
| 2012/0286216 A1 | 11/2012 | Zhang et al. |
| 2013/0209348 A1 | 8/2013 | Ludvik et al. |
| 2014/0148560 A1 | 5/2014 | Qureshi et al. |

OTHER PUBLICATIONS

U.S. Appl. No. 14/259,884 claims (2014).*

* cited by examiner

*Primary Examiner* — Duc Truong (57) ABSTRACT

Disclosed are processes for preparing sol-gel resins from phenolic compounds and aldehydes. The process includes reacting an hydroxylated benzene and a catalyst with an aldehyde to form a liquid storage stable intermediate. The storage stable intermediate may then be stored for a period of time before being utilized in a process to prepare the sol-gel resin, in either monolith or particle form, by subsequently reacting the intermediate with an hydroxylated benzene and a catalyst.

26 Claims, 7 Drawing Sheets

Fig. 1 Invention

The exotherm is minimized by addition of the formaldehyde over a period of time.

Fig. 2 Invention

The exotherm is minimized by addition of the formaldehyde over a period of time.

Fig. 3 Invention

The exotherm is minimized by addition of the formaldehyde over a period of time.

Fig. 4 Invention

The exotherm is minimized by addition of the formaldehyde over a period of time.

Fig. 5 Incremental pore volume as measured by BET

Fig. 6 Incremental Pore Volume as a Function of Width (Example 4a )

Fig. 7 Incremental Pore Volume as a Function of Width (Example 4b)

Fig. 8 Incremental Pore Volume as a Function of Width (Example 4c)

METHOD FOR PREPARING A SOL-GEL RESIN

RELATED APPLICATION DATA

This application is a continuation-in-part to U.S. Ser. No. 14/259,884, which further claims benefit to U.S. Provisional Application No. 61/815,401, filed Apr. 24, 2013 now U.S. Pat. No. 9,353,208, of which the entire contents of these applications are incorporated by reference herein.

BACKGROUND OF THE INVENTION

1. Field of the Invention

The invention relates to the production of resins. The invention particularly relates to the production of sol-gel resins.

2. Background of the Art

The production of sol-gel resins can be difficult due to the lack of control during the gelation of the polymers. The polymerization necessary to produce a sol-gel may result in a form difficult to process further. In conventional sol-gel polymerizations of phenols and aldehydes, it is often necessary to make small batches since current technology requires that the sol-gel be formed as a monolith that would require extensive handling. This can be undesirable in commercial applications where economy is often found in scale.

It would be desirable in the art to be able to produce large batches of phenolic aldehyde sol-gel resins. It would be particularly desirable in the art to make such large batches. There continues to be a need in the art for new and improved methods for transforming the sol-gel from a monolith to a more suitable form for manufacture, packaging, and processing. The present invention fulfills these needs and provides further related advantages.

SUMMARY OF THE INVENTION

In one aspect, the invention is a method for preparing a sol-gel comprising: introducing a hydroxylated benzene (such as phenol, catechol, resorcinol, hydroquinone, and phloroglucinol), catalyst, and optionally water into a reactor to form a catalyzed phenol; introducing into the reactor, with agitation, an aldehyde; maintaining the controlled reaction for period of time sufficient to consume a portion of the hydroxylated benzene to form a liquid resin precursor; transferring the resin precursor from the reactor into a mixer; and agitating the resin precursor for a period of time sufficient to form sol-gel particulates.

In another aspect, the invention is a method for preparing a sol-gel comprising: introducing a hydroxylated benzene, catalyst, and optionally water into a mixer; introducing into the mixture, with agitation, an aldehyde; and maintaining the controlled reaction for a period of time sufficient to form sol-gel particulates.

In another aspect, the invention is a method for preparing a sol-gel resin comprising: introducing a first hydroxylated benzene and a first catalyst into a reaction vessel; introducing an aldehyde into the reaction vessel to form a first liquid reaction mixture; reacting the first liquid reaction mixture for a period of time sufficient to consume a portion of the first hydroxylated benzene; adding a second catalyst the first liquid reaction mixture to form a liquid storage stable intermediate having a viscosity; introducing a second hydroxylated benzene to the liquid storage stable intermediate to form a second liquid reaction mixture; and transferring the second reaction mixture to a container and curing at a temperature of from 45 to 95° C. to form a sol-gel resin.

In another aspect, the invention method for preparing a sol-gel resin comprising: introducing a first hydroxylated benzene and a first catalyst into a reaction vessel; introducing an aldehyde into the reaction vessel to form a first liquid reaction mixture; reacting the first reaction mixture for a period of time sufficient to consume a portion of the first hydroxylated benzene; adding a second catalyst to the first reaction mixture to form a liquid storage stable intermediate having a viscosity; introducing a second hydroxylated benzene to the liquid storage stable intermediate to form a second liquid reaction mixture; and agitating the second liquid reaction mixture for a period of time sufficient to form the sol-gel resin in a particulate form.

In another aspect, in the above methods, the liquid storage stable intermediate is stable for at least 3 days at a temperature of between about 2° C. to about 25° C. while exhibiting a change in the viscosity of less than 100% as measured by Brookfield viscosity at 25° C.

In another aspect, in the above methods, the first hydroxylated benzene comprises phenol and the second hydroxylated benzene comprises resorcinol, or the first hydroxylated benzene consists essentially of phenol and the second hydroxylated benzene consists essentially of resorcinol.

In another aspect, in the above methods, up to 85 mole % of a total amount of the first hydroxylated benzene and second hydroxylated benzene comprises phenol.

In another aspect, in the above methods, the first catalyst is a basic catalyst, and the second catalyst is an acid catalyst.

In another aspect, in the above methods, the aldehyde is introduced to control a reaction exotherm over a period of time sufficient to consume from about 20% to about 75% of the aldehyde; the molar ratio of a total of the first and the second hydroxylated benzene to the aldehyde is about 0.20 to about 0.75; and/or the sol-gel resin is cured at a temperature of from about 50° C. to about 100° C.

In another aspect, the above methods are free of a step to isolate the sol-gel resin from a suspending liquid reaction media, or are free of reaction phases that are immiscible or insoluble with each other.

In another aspect, in the above methods where the sol-gel resin is prepared in a particulate form, the second liquid reaction mixture is agitated under conditions sufficient to produce the sol-gel resin having an average particle size of from about 0.5 mm to about 20 mm. In another aspect, the second liquid reaction mixture is agitated at a temperature between about 25° C. to about 120° C.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawing(s) wherein:

FIG. 6 is a graph illustrating certain physical properties of Example 4a.

DESCRIPTION OF THE PREFERRED EMBODIMENTS

For the purpose of the present application, the following terms are defined as follows:

"Acid" refers to any substance that is capable of lowering the pH of a solution.

"Base" refers to any substance that is capable of raising the pH of a solution.

"Carbonizing" and "pyrolyzing", refer to the process of heating a carbon-containing substance at a carbonization dwell temperature in an inert atmosphere (e.g. argon or nitrogen) or in a vacuum so that the targeted material collected at the end of the process is primarily carbon.

"Catalyst" refers to a material which alters the reaction rate.

"Granular gel" refers to a sub-class of polymer gel wherein the sol gel was further condensed under agitation to the molecular weight wherein it has been formed into granules.

"Monolith" refers to a solid, three-dimensional structure that is not particulate in nature.

"Monomer" and/or "Polymer precursor" refers to the compounds used in the preparation of a polymer.

"Polymer" refers to a substance in which monomers are added to each other to form long-chain molecules.

"Pore" refers to an opening or depression in the surface, or a tunnel in a carbon material.

"Pore structure" refers to the layout of the surface of the internal pores within a material, such as an activated carbon. Components of the pore structure include pore size, pore volume, surface area, density, pore size distribution, and pore length.

"Surface area" refers to the total specific surface area of a substance often measurable by the BET technique which evaluates surface area by measuring the adsorption of gas molecules in a solid material relative to pressure. The porous structure of a sample was measured by nitrogen adsorption method using a Micromeritics TriStar II 3020. BET surface area was calculated by applying the BET (Brunauer-Emmett-Teller) theory. The micropore volume and micropore surface area was obtained by using the t-plot method. The total pore volume was calculated based on desorption isotherm at relative pressure of 0.99.

"Sintering" refers to a material's tendency to agglomerate into larger units wherein it may become difficult to process, requiring it to be crushed or ground by hand or mechanical means.

The invention pertains to polymer gels and methods for manufacturing the resins used to produce them. More specifically, the present invention pertains to those resins which are prepared from hydroxylated benzenes (such as phenol, catechol, resorcinol, hydroquinone, and phloroglucinol) and aldehydes (such as formaldehyde, furfural, glutaraldehyde, and glyoxal). This reaction is done in the presence of an acid and/or a base.

In the case of phenolic resins prepared from phenol-formaldehyde reactions (or the like, as previously described), the polymerization to form a polymer gel can be accomplished by reacting polymer precursors with the use of a catalyst and for a sufficient period of time to produce the polymer. This time will vary dependent upon the catalyst, amount of catalyst, temperature, and the monomers being used.

Typically reported methods for producing the resin gels include dispensing a solution of precursor materials into a container and allowing it to gel into a monolith, or by dispersing the reactant precursors in a suspension liquid medium where they gel to form particles.

It is desirable for the solid gel to be in a form which can easily be handled and processed, such as in particles or granules. Techniques for creating polymer gel particles from monolithic material include manual or mechanical means of size reduction such as grinding, milling, sieving, or combinations thereof. Various types of mills can be employed such as roller, bead, and ball mills and rotary crushers and similar particle creation equipment known in the art. The sieved particles are then stored in sealed containers until needed. The milling process can be costly and has an inherit concern regarding the dust generated.

Other methods for producing resin gels having desired particle size and particle size distribution include but are not limited to dispersion, emulsion or suspension polymerization methods. Such methods require a separation step to isolate the gel particles from the suspending liquid media and may be prone to a particle size distribution which is difficult to control.

A viable manufacturing process for making gelled particles having desired particle size and particle size distribution must overcome these and other limitations.

In one aspect, the current invention relates to a process for producing resin gel particles from a sol-gel reaction wherein the precursor reactants are agitated during the transition from liquid to solid phase in order that gel granules of desired particle size and particle size distribution are produced without the requirement of grinding or milling. In another aspect of the current invention, the gel granules of desired particles and particle size are produced without the use of reaction phases that are immiscible or insoluble with each other or with carrier fluids. In another aspect of the current invention, the gel granules of desired particles and particle size are produced without the requirement of a step to separate solids from liquid. In another embodiment the gel granules are produced without the need to isolate the gel granules from a suspending liquid media, and without the need for recycling of material in order to better control particle size distribution.

In another aspect, the current invention relates to a process for producing resin gel particles of a desired size, or a monolith resin gel, from a sol-gel reaction wherein precursor reactants initially form a liquid storage stable intermediate. In one aspect, the liquid intermediate is storage stable as measured by viscosity over time, with the viscosity being dependent upon the storage temperature, amount of solids, pH and other factors known in the art. In another aspect the liquid intermediate is free from resorcinol. In another aspect, the liquid intermediate exhibits a change in viscosity of less than 100% or 0%, or 40% or 20%, as measured by Brookfield viscosity at 25° C., for at least 3 days, or at least 10 days, or at least 14 days, or at least 28 days, or at least 40 days when stored at about room temperature (i.e. about 25° C.). In another aspect, the liquid intermediate exhibits a change in viscosity of less than 30% or 20% or 10%, as measured by Brookfield viscosity at 25° C., for at least 3 days, or at least 10 days, or at least 14 days, or at least 28 days, or at least 40 days, when stored at a temperature of between about 2° to about 25° C.

Sol Gel Granule Preparation

The sol gels may be prepared in a one-step process, or a two-step process or a process that utilizes a liquid storage stable intermediate. The two step process comprises introducing a hydroxylated benzene (such as phenol, catechol, resorcinol, hydroquinone, and phloroglucinol), catalyst, and optionally water into a reactor to form a mixture; introducing into the mixture, with agitation, an aldehyde; maintaining the controlled reaction for period of time sufficient to consume preferably at least 60% of the hydroxylated benzene to form a liquid resin precursor; transferring the resin precursor from the pre-reactor into a mixer; and agitating the resin precursor for a period of time and at a temperature sufficient to form sol-gel granules.

The single step process comprises introducing a hydroxylated benzene, catalyst, and optionally water into a mixer; introducing into the mixture, with agitation, an aldehyde; and maintaining the controlled reaction for a period of time sufficient to form a sol-gel. In each of these examples, the material is permitted to polymerize until it has become a gel (polymer gel) and further mixed until particles are formed having the shape of granules. These granules are then further mixed until they are polymerized to the extent that they no longer possess sufficient "tack" to agglomerate. This stage is to assure there is no sintering during packaging, shipping, and storage. The material thus made is found to be free flowing from the manufacturing equipment and packaging. This eliminates the present practice of crushing by hand or mechanical means.

The process that utilizes a liquid storage stable intermediate comprises introducing a first hydroxylated benzene and a catalyst into a reaction vessel; introducing an aldehyde into the reaction vessel to form a first liquid reaction mixture reacting the first reaction mixture for a period of time sufficient to consume from about 20% to about 75% of the aldehyde to form a liquid storage stable intermediate. The storage stable intermediate may then be stored for a period of time before being utilized in a process to prepare a sol-gel resin in either monolith or particle form.

The process that utilizes a liquid storage stable intermediate also comprises introducing a first hydroxylated benzene comprising phenol, consisting essentially of phenol, and/or free of resorcinol, and a catalyst into a reaction vessel; introducing an aldehyde into the reaction vessel to form a first liquid reaction mixture; reacting the first reaction mixture for a period of time sufficient to consume from about 20% to about 75% of the aldehyde to form, with the addition of an acid, a liquid storage stable intermediate. The storage stable intermediate may then be stored for a period of time before being utilized in a process to prepare a sol-gel resin in either monolith or particle form using a second hydroxylated benzene comprising resorcinol or consisting essentially of resorcinol. Separating the phenol-aldehyde reaction from the resorcinol-aldehyde reaction has the advantages of reducing the amount of free phenol, and reducing the competing reactions of the phenol with the aldehyde and of the resorcinol with the aldehyde, which leads to undesirably high molecular weight components. The resorcinol may now be added at a much lower temperature to better control reaction temperatures.

The process that utilizing the liquid storage stable intermediate, as described, also provides the advantage of replacing a portion of the higher cost resorcinol, with lower costing phenol. In some prior art methods to prepare sol-gel resins, for example, the hydroxylated benzene utilized consist entirely of resorcinol. The present invention allows for up to about 85 mole % or about 25 mole % to about 85 mole %, or about 40 mole % to about 80 mole %, or about 65 mole % to about 75 mole % of resorcinol used in such conventional methods to be replaced with lower cost phenol, while maintaining a favorable balance of properties of the sol-gel resin. In addition, the intermediate produced may be used in small or large quantities, in monolith or particulate form, as the need for final sol-gel resin products arises.

The catalysts useful with the methods of the invention can be either acidic and/or basic. In most embodiments of the application, the hydroxylated benzene and catalyst will be charged into a reactor in the presence of a solvent. In many embodiments, the solvent will be water. Other solvents useful with the methods of the application include but are not limited to ethanol, methanol, and isopropyl alcohol. In the practice of the methods of the application, an aldehyde is introduced into a hydroxylated benzene or a mixture of hydroxylated benzenes. Any aldehyde known to those of ordinary skill in the art to be useful for making phenolic resins may be used with the method of the application. In some embodiments sufficient water is added to the reaction mixture to obtain a calculated solids content, based on the amounts of hydroxylated benzene components and aldehyde components, of about 10 to about 70%, or about 20 to about 60%, or about 20 to 40% or about 40 to 60%.

When the aldehyde is introduced into the hydroxylated benzene or mixture of hydroxylated benzenes, it is introduced with agitation. In many embodiments, this agitation is the result of stirring. In addition to stirring the agitation can be accomplished by any means known to be useful to those of ordinary skill in the art. During the process of preparing a sol-gel resin using the methods of the application, the consistency of the reaction mass may go from being nearly as low in viscosity as water to the consistency of a very heavy dough and then finally to discrete particles or pellets. In one embodiment, the molar ratio of hydroxylated benzene components to aldehyde components: about 0.20 (i.e. 1:5) to about 0.75 (i.e. 1:1.3), about 0.35 (i.e. 1:2.9) to about 0.65 (i.e. 1:1.54), about 0.40 (i.e. 1:2.5) to 0.60 (i.e. 1:1.67) or about 0.45 (i.e. 1:2.2) to 0.55 (i.e. 1:1.82).

In some embodiments of the methods of the application, conventional stirring may be sufficient. Agitator design can aid in the formation of the desired particle size and also minimize the power requirements as the reaction progresses. However, in other embodiments, the agitation necessary to the methods may be too difficult to achieve using simple stirring. In these embodiments it may be more desirable to resort to kneading or even extrusion. Combinations of these methods of agitation may also be used.

At least one benefit of agitation is the distribution of heat from the reaction more evenly over the entire reaction mass. In the practice of the methods of the application, the agitation may be commenced at any point prior to the accumulation of heat to undesirable levels within the mixer or reactor.

In some embodiments of the method of the application, the rate of addition of the aldehyde is used as a tool to control the accumulation of heat. This period may vary as a function of the reactants used and the properties of the mixer or the reactor employed.

It is desirable in many embodiments to maintain the temperature of the reaction mass at 90° C. or less while in the mixer or the reactor. In general, it would be desirable to maintain the temperature of the reaction mass from about 25° C. to about 120° C. In some embodiments, the temperature range is from about 40° C. to about 65° C. In the practice of the methods of the application however, any temperature may be employed that produces a composition with desirable properties.

During the production of the sol-gel resin, the temperature of the reaction mass is controlled to affect the rate of gelation, and the pore structure. In at least one embodiment, this controlling of temperature is performed by the use of a cooling jacket, cooling coils, or other method of cooling the reactor or mixer being employed. In most of these embodiments, the fluid used within the cooling jacket or cooling coil will be either air or water. Other fluids may be used and still be within the scope of the claims of this application.

It is sometimes desirable when producing a sol-gel resin to allow the reaction mass to increase in temperature at the end of the reaction. To that end, during some embodiments of the method of the application, the temperature of the reaction mass is controlled up until at least 70%, or from about 70% to about 99% of the hydroxylated benzene is consumed. After that point, the reaction mass is allowed to reach thermal equilibrium without further cooling. In other embodiments cooling is maintained until about 75% of the hydroxylated benzene is consumed. In still other embodiments, the percentages are 90% and 99%.

An alternative means of monitoring the course of the reaction includes monitoring the consumption of the aldehyde rather than the hydroxylated benzene. When this method is employed, it is desirable that the temperature be controlled for a period of time sufficient to consume from about 30% to about 90% of the aldehyde. In some embodiments it may be desirable to control the temperature for the period of time sufficient to consume from about 40% to about 70% of the aldehyde.

In marked contrast to conventional means of making such sol-gel resins, the methods of the application results in a particle or pellet. As compared to the monolithic products resulting from a conventional processes, which most often require pulverization prior to use, the resin particles produced by the methods of the application may be easily and safely handled. Typically, embodiments of the methods of the invention may be used to produce a resin having an average particle size of from about 0.5 mm to about 20 mm. In some applications however, the agitation being used can be controlled to produce particles of resin having different diameters.

In addition to the other advantages of the particles produced using the methods of the application, the resin particles may be formed into an article having a desired range of geometry. Also where desired, articles prepared from particles resulting from the methods of the application may be cured at a temperature ranging from about 50° C. to about 100° C. Sometimes it may be desirable to cure at temperatures ranging from about 80° C. to about 90° C.

In practicing the methods of the application, it may be desirable to polymerize the reactants in one step or two. In a two-step process, the aldehyde is introduced into the hydroxylated benzene mixture within a first reactor, and after at least 60% of the hydroxylated benzene has been consumed, transfer the reaction mass to a second vessel.

In an alternative embodiment, a single step process may be used wherein the entire reaction takes place in a single reactor. For the purposes of this application, the terms mixer or reactor are defined to include any device which is capable of carrying out the reaction, with agitation, and at temperatures sufficient to form a sol-gel resin. Further any method of mixing either within or outside of a reactor known to those of ordinary skill in the art may be employed with the application. Such methods employ agitators and mixers including but are not limited to dough kneaders, Sigma-Aldrich® mixers, twin-screw extruders, BUSS™ kneaders, and pelletizers, planetary mixers or Cowles Mixers such as, for example, those sold by Charles Ross & Son Co. of Hauppauge, N.Y. under the brand name PowerMix™ PDM, and the like. Also useful may be cell-reactors such as those employed in U.S. Pat. No. 4,128,568 which is incorporated herein in its entirety by reference; mono- or twin-screw reactors such as those described in Plaste and Kautschuk 30 (1983) 181-185; and the like.

In some embodiments of the methods of the application, it is desirable to control the pressure of the reaction mass and to avoid the emission of reactants and/or solvents. In these embodiments, the reactor or mixer may be equipped with vacuum systems. Especially in embodiments where it is desirable to avoid the emission of vapors, the vacuum systems may include components to trap such emissions. One such component would be a reflux system. Any component useful to those of ordinary skill in the art for preventing or reducing the emission of undesirable compounds may be employed with or without the vacuum systems.

EXAMPLES

Example 1

Figure 1:
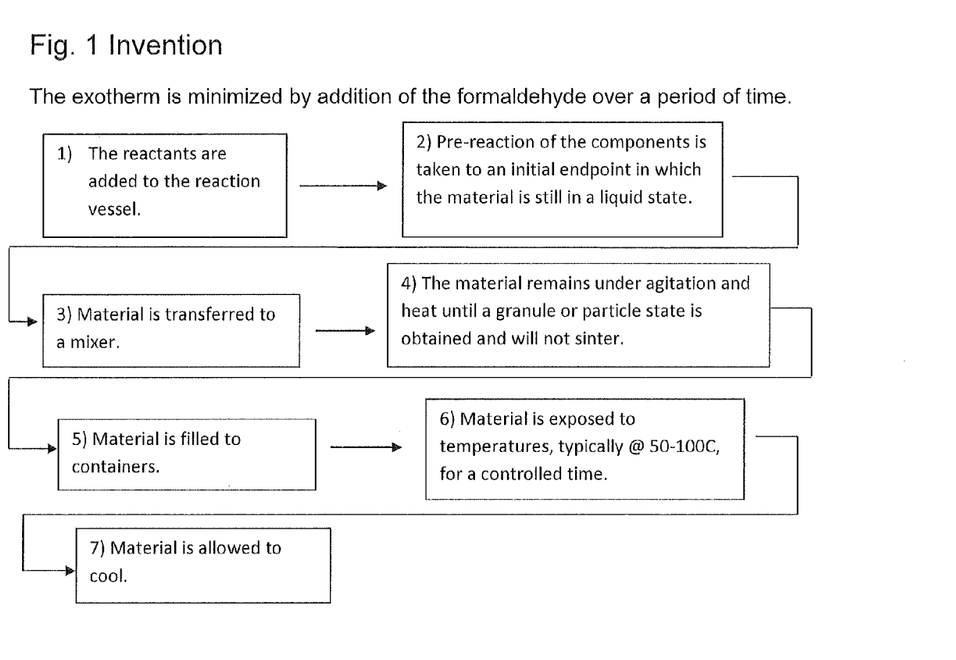
FIG. 1, is a flow chart showing the method of a two-step process of the invention; this process does not result in a monolith and requires minimal further handling.

Referring to FIG. 1, the gel was prepared from a mixture of acetic acid, ammonium acetate, water, phenol, resorcinol, and formaldehyde. Sufficient water was added in order to obtain calculated solids of 31.8%. The calculated solids value was based upon recipe amounts formaldehyde, phenol, and resorcinol. The formaldehyde was added to the other components in a reaction vessel over a period of 50 minutes at 60° C. The contents were held at 60° C. for 10 minutes after the formaldehyde addition had been completed. The material was cooled to 55° C. and condensed for 170 minutes to obtain a free formaldehyde value of about 6.8% and a free phenol value of about 7.1%. The material was transferred to a mixer where it remained under agitation with heating until a granular or particle state was obtained. The phenol:resorcinol ratio was 0.54 (i.e. 35 mole % of resorcinol was replaced with phenol). The phenol, resorcinol: formaldehyde ratio was 0.50. A resin thus made produced product granular in appearance, having free phenol of 7.05%, free formaldehyde of 6.75%. The material thus made was then transferred to a container and exposed to a temperature of 85° C. for 57 hours in order to bring the resin to cure. The free phenol was 0.08% and the free formaldehyde was 3.8%.

Example 2a

Figure 2:
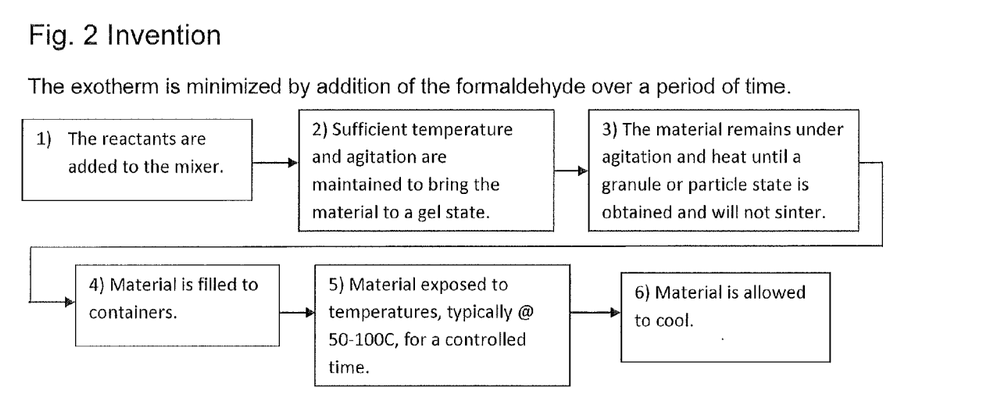
FIG. 2, is a flow chart showing the method of a one-step process of the invention; this process does not result in a monolith and requires minimal further handling.

Referring to FIG. 2, the gel was prepared from a mixture of acetic acid, ammonium acetate, water, phenol, resorcinol, and formaldehyde. Sufficient water was added in order to obtain calculated solids of 29.1%. The calculated solids content was based upon recipe amounts formaldehyde, phenol, and resorcinol. The formaldehyde was added to the other components in a mixer over a period of 50 minutes at 60° C. The contents were held at 60° C. for 10 minutes after the formaldehyde addition was completed. The material was cooled to 55° C. and condensed for about 2.5 hours to obtain a free formaldehyde value of about 5% and a free phenol value of about 3.5% at which time a granular or particle state was obtained. The phenol:resorcinol ratio was 0.25 (i.e. 20 mole % of resorcinol was replaced with phenol). The phenol, resorcinol:formaldehyde ratio was 0.50. A resin thus made produced product granular in appearance, having a free phenol value of 3.5%, and a free formaldehyde value of 4.9%. The material was then transferred to a container and exposed to a temperature of 85° C. for 60 hours to bring the resin to cure. No detectable free phenol was found and the free formaldehyde was 2.25%.

Example 2b

Also referring to FIG. 2, the gel was prepared from a mixture of acetic acid, ammonium acetate, water, resorcinol, and formaldehyde. Sufficient water was added in order to obtain calculated solids of 30.0%. The calculated solids value was based upon recipe amounts formaldehyde and resorcinol. The formaldehyde was added to the other components in a reaction vessel over a period of 50 minutes at 60° C. Ten minutes after the formaldehyde feed was completed, the material was cooled to 52° C. and condensed for 130 minutes. The material was then transferred to a mixer and condensed at 50° C. for 1 hour. The resorcinol:formaldehyde ratio was 0.5. A resin thus made produced product granular in appearance, having free formaldehyde of 3.4%. The material was then transferred to a container and exposed to a temperature of 85° C. for 50 hours in order to bring the resin to cure.

Example 2c

Figure 5:
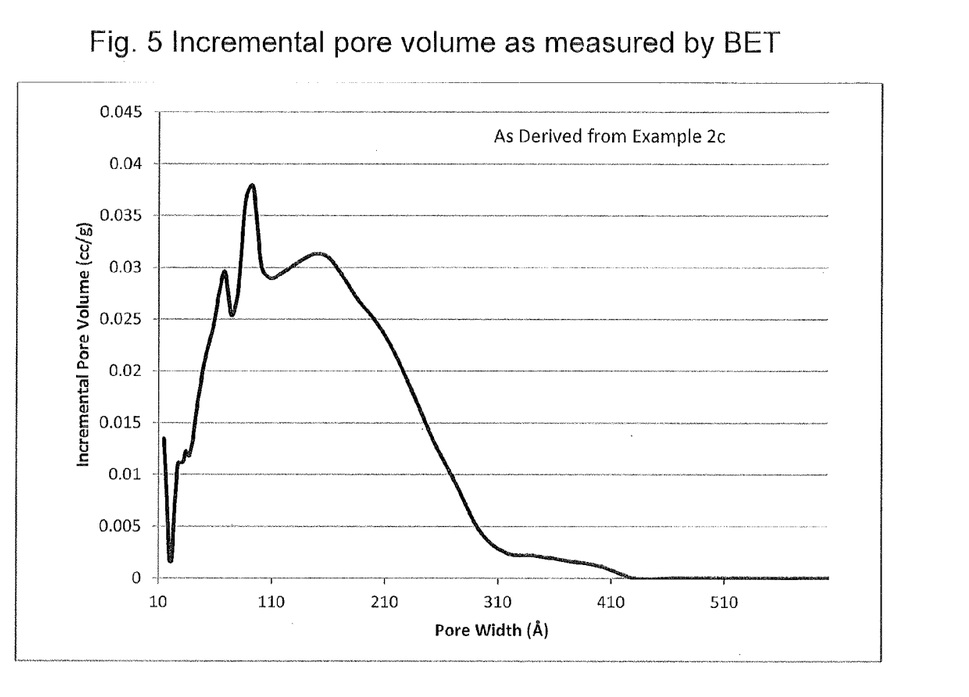
FIG. 5 is a graph illustrating certain physical properties of Example 2c.

Further referring to FIG. 2. the gel was prepared from a mixture of acetic acid, ammonium acetate, water, resorcinol, and formaldehyde. Sufficient water was added in order to obtain calculated solids of 29.5%. The calculated solids value was based on recipe amounts formaldehyde and resorcinol. The formaldehyde was added to the other components over a period of 50 minutes at 60° C. and held another 10 minutes at 60° C. The material was cooled to 52° C. and condensed for 150 minutes. The resorcinol:formaldehyde ratio was 0.5. A resin thus made produced product granular in appearance. The material was then exposed to a temperature of 85° C. for 36 hours in order to bring the resin to cure. A resin thus made gave BET results as shown in FIG. 5.

Example 3

Figure 3:
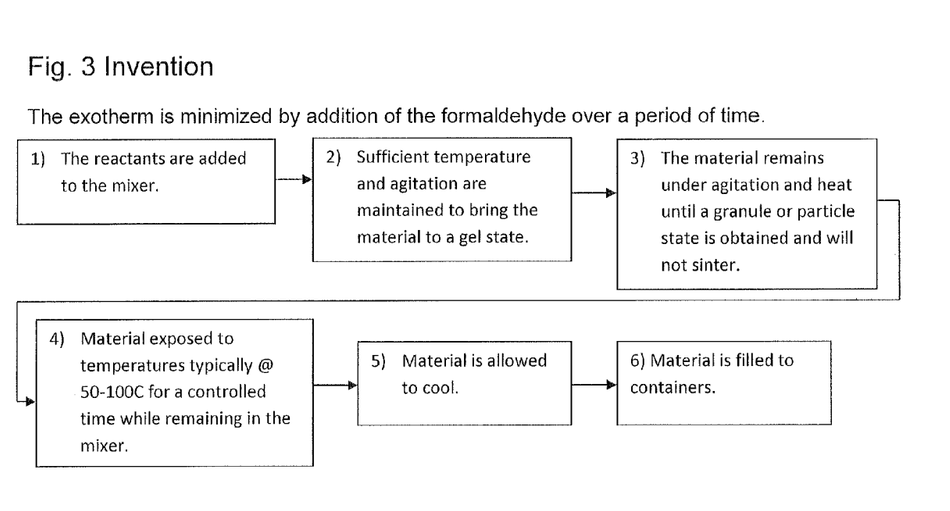
FIG. 3, is a flow chart showing the method of preparing the invention entirely in the mixer, omitting the post-condensation in the oven; this alternative embodiment of the single step process does not result in a monolith and requires minimal further handling.

Referring to FIG. 3, the gel was prepared from a mixture of acetic acid, ammonium acetate, water, resorcinol, and formaldehyde. Sufficient water was added in order to obtain calculated solids of 29.5%. The calculated solids value was based upon recipe amounts formaldehyde and resorcinol. The resorcinol:formaldehyde ratio was 0.5. The formaldehyde was added to the acetic acid, ammonium acetate, water, and resorcinol in a mixer over a period of 50 minutes at 65° C. The mix was held at 65° C. for 10 minutes after the formaldehyde addition. It was then cooled to and condensed at 55° C. for 188 minutes. The temperature was then increased to 70° C. and held for 11 hours and 45 minutes. It was cooled to less than 30° C. and transferred to a container. A resin thus made produced product granular in appearance, having free formaldehyde of 1.8%.

Example 4a

Figure 6:
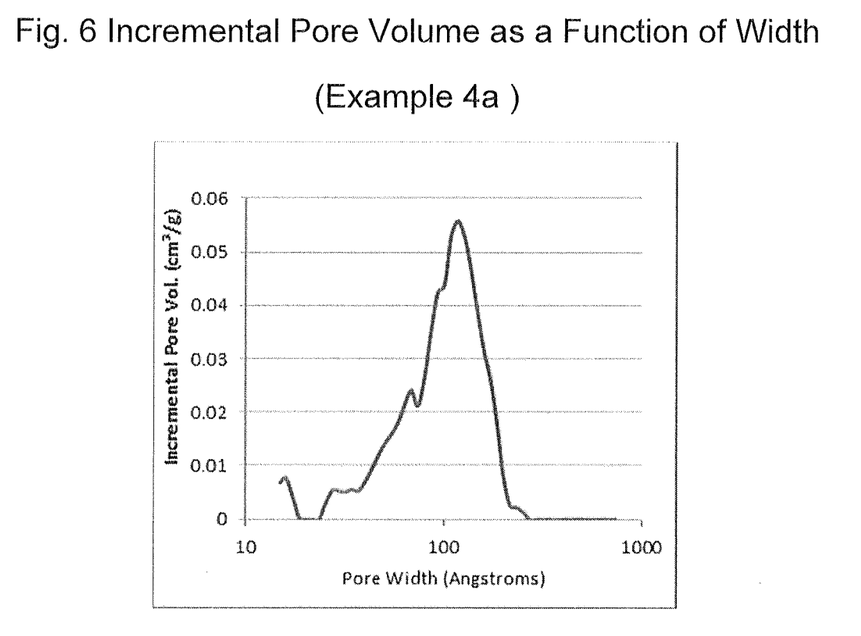

The gel was prepared from a mixture of acetic acid, ammonium hydroxide, water, phenol, resorcinol, and formaldehyde. Sufficient water was added in order to obtain calculated solids of 54.0%. The calculated solids value includes recipe amounts formaldehyde, phenol, and resorcinol. The phenol:resorcinol ratio is 2.35 (i.e. about 70 mole % of resorcinol was replaced with phenol). The phenol, resorcinol:formaldehyde ratio is 0.69. The formaldehyde is added to the water, ammonium hydroxide, and phenol over a period of 50 minutes at 65° C. The contents were held at 65° C. for 10 minutes after the formaldehyde addition had been completed. The mix is condensed at 75° C. for 2 hours and 35 minutes to a free formaldehyde value of about 7.5%. The acetic acid is then added and batch is cooled to 37° C. This intermediate product had the following properties: free formaldehyde of 6.1%; free phenol of 6.0%; and pH of 3.2. The resorcinol was then added to the intermediate and allowed to dissolve. The material thus made was then exposed to temperatures of 85° C. for 48 hours in order to bring the resin to cure. The sample was resin thus made into a monolith and gave BET results as shown in FIG. 6.

Example 4b

Figure 7:
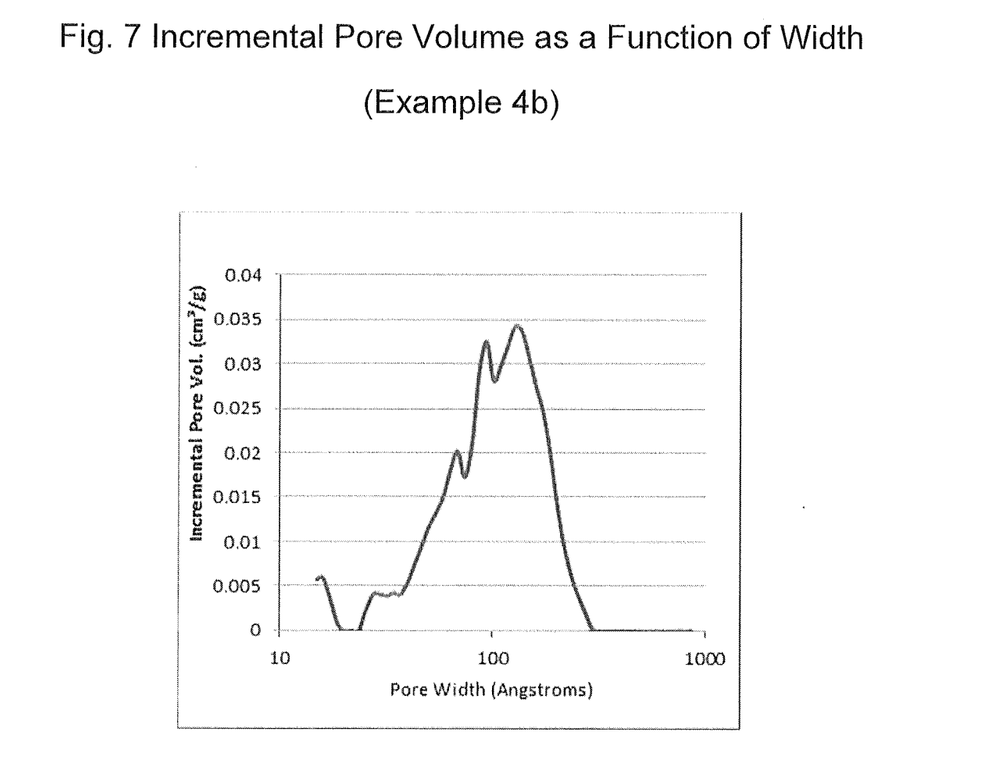
FIG. 7 is a graph illustrating certain physical properties of Example 4b.

The gel was prepared from a mixture of acetic acid, ammonium hydroxide, water, phenol, resorcinol, and formaldehyde. Sufficient water was added in order to obtain calculated solids of 54.7%. The calculated solids value includes recipe amounts formaldehyde, phenol, and resorcinol. The phenol:resorcinol ratio is 3.44 (i.e. about 77 mole % of resorcinol was replaced with phenol). The phenol, resorcinol:formaldehyde ratio is 0.63. The formaldehyde is added to the water, ammonium hydroxide, and phenol over a period of 40 minutes at 65° C. The contents were heated to 72° C. after the formaldehyde addition had been completed. The mix is condensed at 72° C. for 3 hours. The acetic acid is then added and batch is cooled to 30° C. This intermediate product had the following properties: free formaldehyde of 6.2%; free phenol of 5.1%; and pH of 3.22. The resorcinol was then added to the intermediate and allowed to dissolve. The material thus made was then exposed to temperatures of 95° C. for 48 hours in order to bring the resin to cure. The sample was resin thus made into a monolith and gave BET results as shown in FIG. 7.

Example 4c

Figure 4:
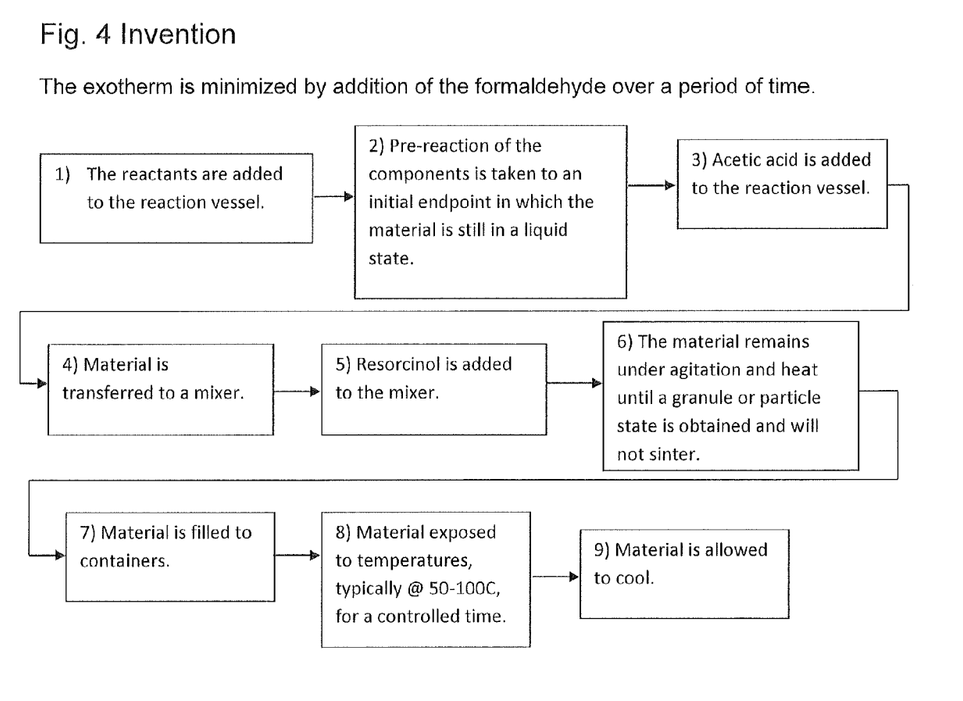
FIG. 4, is a flow chart showing the method of a two-step process of the invention wherein an intermediate phase is first prepared followed by the addition of resorcinol; this process does not result in a monolith and requires minimal further handling.
Figure 8:
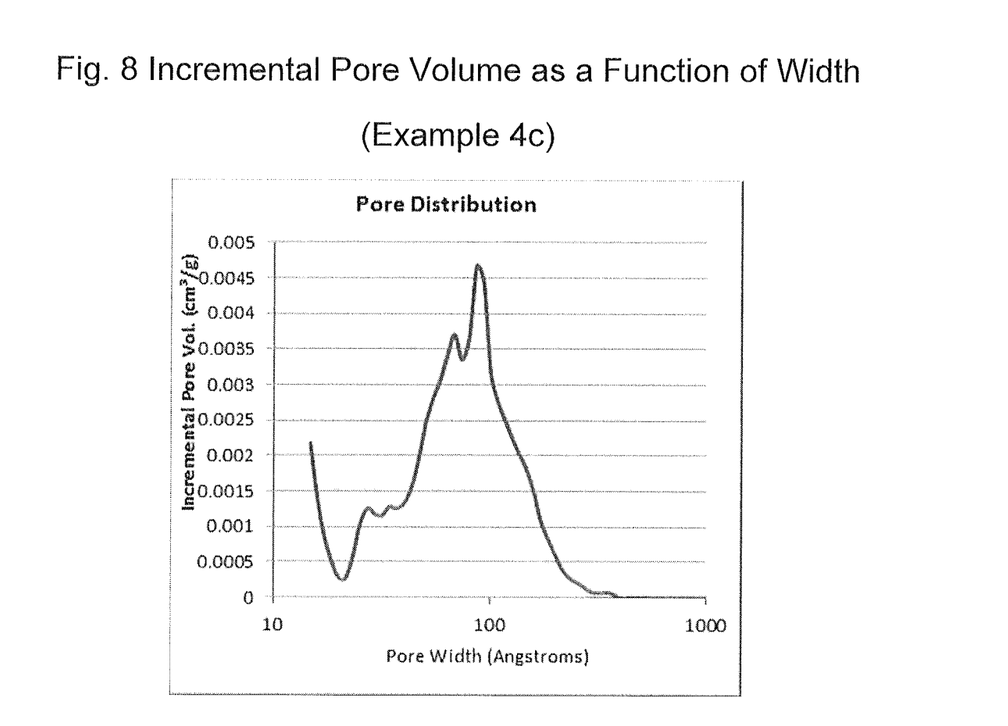
FIG. 8 is a graph illustrating certain physical properties of Example 4c.

Referring to FIG. 4, the gel was prepared from a mixture of acetic acid, ammonium hydroxide, water, phenol, resorcinol, and formaldehyde. Sufficient water was added in order to obtain calculated solids of 52.7%. The calculated solids value includes recipe amounts formaldehyde, phenol, and resorcinol. The phenol:resorcinol ratio is 3.0 (i.e. about 75 mole % of resorcinol was replaced with phenol). The phenol, resorcinol:formaldehyde ratio is 0.65. The formaldehyde is added to the water, ammonium hydroxide, and phenol over a period of 30 minutes at 65° C. The contents were held at 65° C. for 10 minutes after the formaldehyde addition had been completed. The contents were heated to 72° C. after the formaldehyde addition had been completed. The mix is condensed at 72° C. for 3 hours. The acetic acid is then added and batch is cooled to 35° C. This intermediate product had the following properties: free formaldehyde of 6.3%; free phenol of 5.0%; and pH of 3.3. The resorcinol was then added to the intermediate and allowed to dissolve. The intermediate was then heated to 68-70° C. This temperature was maintained for 30 minutes. The intermediate was then cooled to 58-60° C. This temperature was maintained for 90 minutes whereupon the batch was cooled to 35° C. A resin thus made had a free phenol of 4.0%, free formaldehyde of 2.2%, and was of particulate form. The material was then exposed to 85° C. for 48 hours in order to bring the resin to cure. The sample gave BET results as shown in FIG. 8.

BET results of the lots above proved surface area and distribution with the raw material cost savings.

We claim:
1. A method for preparing a sol-gel resin comprising:
    introducing a first hydroxylated benzene and a first catalyst into a reaction vessel;
    introducing an aldehyde into the reaction vessel to form a first liquid reaction mixture;
    reacting the first liquid reaction mixture for a period of time sufficient to consume a portion of the first hydroxylated benzene;
    adding a second catalyst the first liquid reaction mixture to form a liquid storage stable intermediate having a viscosity;
    introducing a second hydroxylated benzene to the liquid storage stable intermediate to form a second liquid reaction mixture; and
    transferring the second reaction mixture to a container and curing at a temperature of from 45 to 95° C. to form a sol-gel resin.
2. The method of claim 1 wherein the liquid storage stable intermediate is stable for at least 3 days at a temperature of between about 2° C. to about 25° C. while exhibiting a change in the viscosity of less than 100% as measured by Brookfield viscosity at 25° C.
3. The method of claim 1 wherein the first hydroxylated benzene comprises phenol and the second hydroxylated benzene comprises resorcinol.
4. The method of claim 3 wherein the first hydroxylated benzene consists essentially of phenol and the second hydroxylated benzene consists essentially of resorcinol.
5. The method of claim 3 wherein up to 85 mole % of a total amount of the first hydroxylated benzene and second hydroxylated benzene comprises phenol.
6. The method of claim 1 wherein the first catalyst is a basic catalyst.
7. The method of claim 1 wherein the second catalyst is an acid catalyst.
8. The method of claim 1 wherein the aldehyde is introduced to control a reaction exotherm over a period of time sufficient to consume from about 20% to about 75% of the aldehyde.
9. The method of claim 1 wherein the molar ratio of a total of the first and the second hydroxylated benzene to the aldehyde is about 0.20 to about 0.75.
10. The method of claim 1 wherein the sol-gel resin is cured at a temperature of from about 50° C. to about 100° C.

11. The method of claim 1 free of a step to isolate the sol-gel resin from a suspending liquid reaction media.
12. The method of claim 1 free of reaction phases that are immiscible or insoluble with each other.
13. A method for preparing a sol-gel resin comprising:
    introducing a first hydroxylated benzene and a first catalyst into a reaction vessel;
    introducing an aldehyde into the reaction vessel to form a first liquid reaction mixture;
    reacting the first reaction mixture for a period of time sufficient to consume a portion of the first hydroxylated benzene;
    adding a second catalyst to the first reaction mixture to form a liquid storage stable intermediate having a viscosity;
    introducing a second hydroxylated benzene to the liquid storage stable intermediate to form a second liquid reaction mixture; and
    agitating the second liquid reaction mixture for a period of time sufficient to form the sol-gel resin in a particulate form.
14. The method of claim 13 wherein the second liquid reaction mixture is agitated under conditions sufficient to produce the sol-gel resin having an average particle size of from about 0.5 mm to about 20 mm.
15. The method of claim 13 wherein the second liquid reaction mixture is agitated at a temperature between about 25° C. to about 120° C.
16. The method of claim 13 wherein the liquid storage stable intermediate is stable for at least 3 days at a temperature of between about 2° C. to about 25° C. while exhibiting a change in the viscosity of less than 100% as measured by Brookfield viscosity at 25° C.
17. The method of claim 13 wherein the first hydroxylated benzene comprises phenol and the second hydroxylated benzene comprises resorcinol.
18. The method of claim 17 wherein the first hydroxylated benzene consists essentially of phenol and the second hydroxylated benzene consists essentially of resorcinol.
19. The method of claim of claim 17 wherein up to 85 mole % of a total amount of the first hydroxylated benzene and second hydroxylated benzene comprises phenol.
20. The method of claim 13 wherein the first catalyst is a basic catalyst.
21. The method of claim 13 wherein the second catalyst is an acid catalyst.
22. The method of claim 13 wherein the aldehyde is introduced to control a reaction exotherm over a period of time sufficient to consume from about 20% to about 75% of the aldehyde.
23. The method of claim 13 wherein the molar ratio of a total of the first and the second hydroxylated benzene to the aldehyde is about 0.20 to about 0.75.
24. The method of claim 13 wherein the sol-gel resin is cured at a temperature of from about 50° C. to about 100° C.
25. The method of claim 13 free of a step to isolate the sol-gel resin from a suspending liquid reaction media.
26. The method of claim 13 free of reaction phases that are immiscible or insoluble with each other.

* * * * *